US005462207A

United States Patent [19]

Daraktchiev

[11] Patent Number: 5,462,207
[45] Date of Patent: Oct. 31, 1995

[54] ENVIRONMENTALLY SAFE DISPENSING ASSEMBLY FOR ULTRA-PURE LIQUID CHEMICALS

[75] Inventor: Ivan S. Daraktchiev, Leuven, Belgium

[73] Assignee: OCG Microelectronic Materials, Inc., West Paterson, N.J.

[21] Appl. No.: 325,020

[22] Filed: Oct. 19, 1994

[51] Int. Cl.[6] ................................................ B65B 3/04
[52] U.S. Cl. ............................ 222/148; 141/91; 141/92
[58] Field of Search .......................... 222/1, 148, 189.11, 222/330, 482, 387, 388, 394, 386; 141/91, 92, 67; 137/238, 239

[56] References Cited

U.S. PATENT DOCUMENTS

| | | | |
|---|---|---|---|
| 3,359,062 | 12/1967 | Palm | 141/92 |
| 4,273,263 | 6/1981 | Voegele et al. | 222/148 |
| 4,318,431 | 3/1982 | Evans | 141/91 |
| 4,499,932 | 2/1985 | Perigo et al. | 141/91 |
| 5,086,949 | 2/1992 | Vulpitta et al. | 222/148 |

Primary Examiner—Andres Kashnikow
Assistant Examiner—Philippe Derakshani
Attorney, Agent, or Firm—William A. Simons

[57] ABSTRACT

A reusable, high purity liquid chemical dispensing assembly is provided for use in a production line that processes chemically treated articles such as semiconductors. This dispensing assembly contains a high purity liquid chemical, such as photoresist, which it dispenses into a production line application station. The dispensing assembly can be disconnected from the production line when it is essentially emptied of the liquid chemical, and can be then rinsed and purged of chemical residue, and refilled with fresh chemical. The rinsing, purging, and refilling operations are performed in an environmentally safe manner. By providing a reusable dispensing assembly the problem of disposing of chemically polluted containers is eliminated.

3 Claims, 1 Drawing Sheet

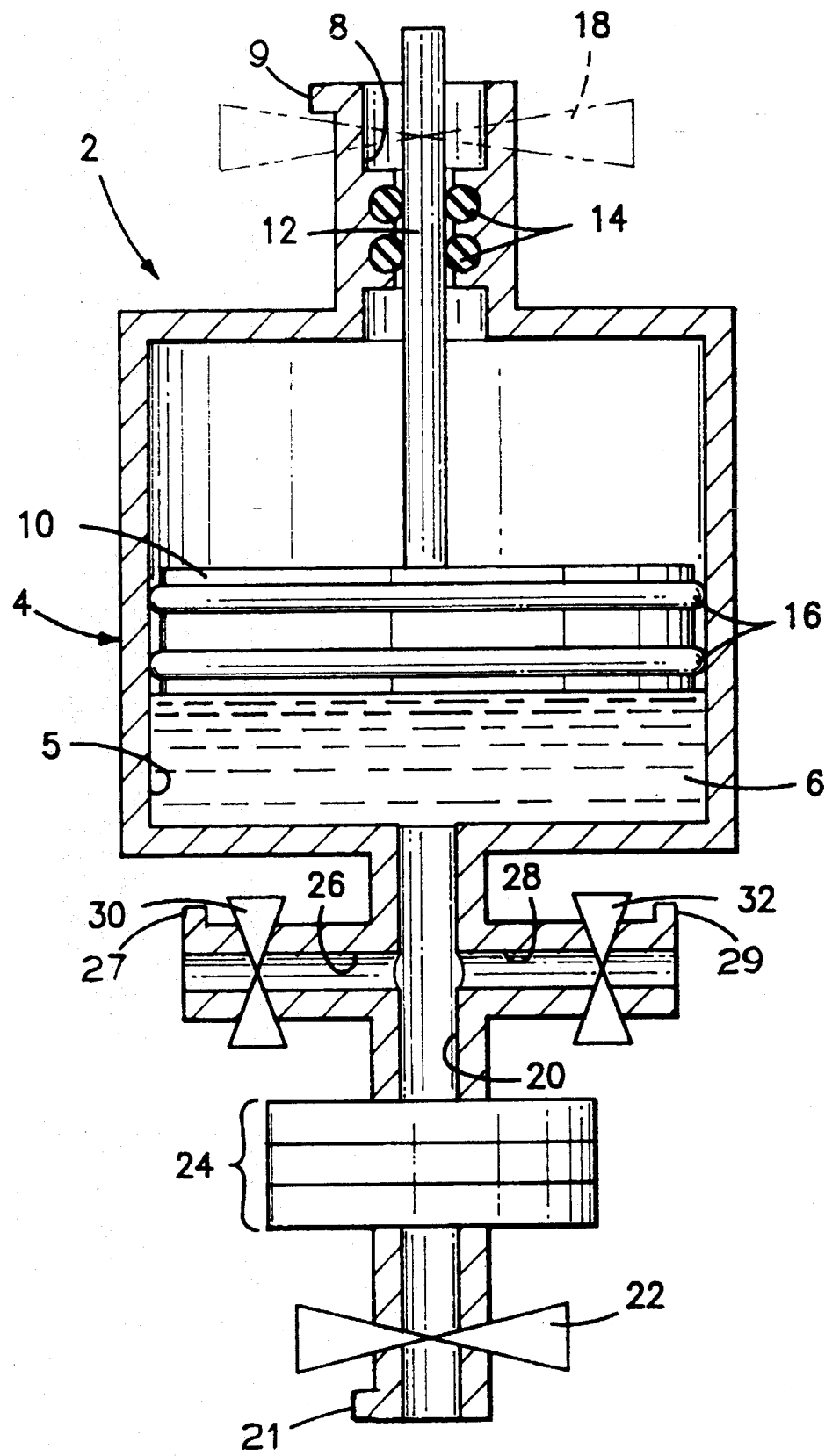

ENVIRONMENTALLY SAFE DISPENSING ASSEMBLY FOR ULTRA-PURE LIQUID CHEMICALS

BACKGROUND OF THE INVENTION

1. Field of the Invention

This invention relates to a dispensing assembly for administering high purity liquid processing chemicals in a production line. More particularly, this invention relates to a dispensing assembly of the character described which can be safely purged of residual chemical, refilled, and reused in the production line.

2. Description of the Art

The production of certain high tech components, such as semiconductors, or the like, may involve the use of ultra high purity liquid chemicals, such as photoresists, to process the components. These chemicals are applied to the components either in a liquid or a vapor form in a closed processing station. The chemicals are dispensed into the processing station from liquid chemical containers which are removably connected to the production line. The liquid chemical may be forced out of the container either by means of a piston which telescopes into the container, or by means of a pressurized stream of an inert gas such as nitrogen, which is fed into the container. When the liquid chemical container has been emptied of the liquid chemical, it is disconnected from the production line and replaced by a filled container.

The problem of safely disposing of the emptied liquid chemical containers in an environmentally safe fashion has proven to be expensive and has not been satisfactorily solved. When the liquid chemical containers are glass, they cannot be recycled safely without washing because of the chemical residue that invariably remains inside of the container. The washing procedure is expensive and time-consuming. Where plastic containers or plastic pouches are used to hold the liquid chemical, recycling of the plastic container material in an environmentally safe fashion cannot be done. Thus the disposal of these containers is a problem which the semiconductor and other related industries have not satisfactorily resolved.

BRIEF SUMMARY OF THE INVENTION

It would be highly desirable to have a reusable liquid chemical dispensing assembly which could be detached from the production line when emptied of chemical, and then cleansed of chemical residue, refilled, and reconnected to the production line. This invention relates to a liquid chemical dispensing assembly which is safely reusable in the production line and which eliminates the problem of disposing of empty, chemically polluted dispensing containers.

The dispensing assembly of this invention is a self-contained unit which can be quickly and easily coupled into, and uncoupled from, a conventional production line. The unit is preferably made from a metal such as electropolished stainless steel SS 316. The internal surfaces of the unit which come into contact with the high purity liquid chemical may be passivated, for example, by reaction with an oxidizing acid such as $HNO_3$ or $H_3PO_4$, or may be otherwise treated so as to provide protection against metal ion contamination of the high purity chemicals from the metal container. The assembly will have a system of valves which allows the chemical reservoir to be used to dispense chemicals to the production line; and to be purged of residual chemical when emptied; and to be refilled with additional liquid chemical after the purge step. The force needed to eject the chemical from the chemical reservoir may be obtained from a piston which is telescoped into the chemical reservoir; or may be obtained from a pressurized stream of inert gas which is directed into the chemical reservoir. Likewise, a piston may be used in conjunction with a pressurized stream of gas to provide the desired dispensing pressure. In such a case, the piston need not include a stem. Conventional quick connect/disconnect joints may be used to connect the dispensing assembly to the production line and to the purge/refill station. The assembly also includes a matrix of valves which are selectively operated, either manually or automatically, to enable the assembly to dispense chemical; and to enable the assembly to be rinsed or purged of residual chemical; and to enable refilling of a rinsed/purged dispensing assembly with additional chemical.

It is, therefore, an object of this invention to provide a high purity liquid chemical dispensing assembly which can be reused to dispense liquid chemicals into a component processing production line.

It is a further object of this invention to provide a dispensing assembly of the character described which dispensing assembly can be safely purged of residual chemical after being emptied into the production line.

It is an additional object of this invention to provide a dispensing assembly of the character described which can be safely removed from the production line for purging and refilling.

It is yet another object of this invention to provide a process for cleaning and refilling previously used chemical dispensings without the need to discard the chemical container portion of the dispensing.

BRIEF DESCRIPTION OF THE DRAWINGS

These and other objects and advantages of the invention will become more readily apparent from the following detailed description of a preferred embodiment thereof when taken in conjunction with the accompanying drawing which is a somewhat schematic sectional view of the dispensing assembly.

DETAILED DESCRIPTION OF SPECIFIC EMBODIMENTS OF THE INVENTION

Referring now to the drawing, there is shown a high purity liquid chemical dispensing assembly formed in accordance with this invention, which assembly is denoted generally by the numeral 2. The dispensing assembly 2 includes a reservoir 4 in which the chemical 6 is disposed. A pressurizing inlet 8 opens into the interior 5 of the reservoir 4. Dispensing pressure may be provided by a piston 10 which may include a stem 12 which extends upwardly into the inlet 8. A pair of seal rings 14 are positioned in the inlet 8 in order to seal the interior 5 of the reservoir 4 relative to ambient surroundings. The chemical dispensing pressure can be supplied simply by the weight of the piston 10, or can be supplied by an auxiliary actuator (not shown) which pushes on the piston stem 12. The manner of using the piston 10 to supply the dispensing pressure will depend largely on the viscosity of the chemical 6 being dispensed. The piston 10 is also provided with seal rings 16 which prevent the chemical 6 from bypassing the piston 10. In the event that the chemical 6 has a sufficiently low viscosity, the piston 10 may be left out of the assembly 2, and the dispensing pressure may be supplied by a stream of pressurized inert gas which is directed into the reservoir interior 5, and which acts directly against the chemical 6. The gas stream will be controlled by a valve 18 (shown in phantom). When required in conjunction with the dispensing of high viscosity chemicals, a solvent lubricant can be provided on the seal rings 16.

The interior 5 of the reservoir 4 opens into a dispensing outlet 20. The dispensing outlet 20 will open into the chemical processing applicator station in the production line (not shown). A valve 22 controls movement of the chemical through the dispensing outlet 20, and a filter assembly 24 may be disposed in the outlet 20 to remove any particulate contaminants from the chemical 6 prior to its reaching the processing station in the production line. A pair of branch lines 26 and 28 open into the dispensing outlet 20 above the filter assembly 24. Valves 30 and 32 are selectively operable to open and close the branch lines 26 and 28, respectively. The line 26 is used to refill the reservoir 4 after it has been emptied on the production line; and the line 28 is used to rinse/purge the emptied reservoir 4 of chemical residue prior to refilling the reservoir 4. When a piston and stem structure is used to provide the dispensing pressure, a stream of inert gas may be admitted through a valved inlet into the space above the piston 10 so as to provide a sufficient overpressure in said space to ensure that the piston is returned to its lowermost position after the rinse/purge operation has been completed.

The assembly 2 operates in the following manner: When the assembly 2 is hooked into the production line and is being used to dispense chemical into the processing station, the valves 30 and 32 will be closed and the valve 22 will be open. If the dispensing pressure is being supplied by a gas stream, the valve 18 will also be open. This valving condition will continue so long as the chemical is being supplied from the reservoir 4 to the processing station. When the reservoir 4 has been emptied of chemical, the valves 18 (if included) and 22 are closed, and the assembly 2 is disconnected from the production line. In order to facilitate removal and reattachment of the assembly 2 to the production line and to refurbishment and refiling lines, the lines 8, 20, 26, and 28 are fitted with quick connect/disconnect fittings, such as bayonet slot lugs 9, 21, 27, and 29, or the like, which mate with complementary fittings in the production and refurbishment/refilling lines. Obviously, the production and refurbishment/refilling lines will be provided with complementary valves (not shown) that control gas and liquid flow in an appropriate manner.

After the assembly 2 has been disconnected from the production line, it will be taken to a refurbishment/refilling station where the assembly 2 will be purged of chemical residue and will be refilled with fresh chemical. At the refurbishment/refilling station, the lines 26 and 28 will be attached to complementary inlet lines, and the line 20 will be connected to a flushing line. Prior to the rinsing/purging operation, the filters 24 may be removed from the line 20. The line 28 is a rinse/purge line which admits a chemical solvent and an inert gas stream into the interior of the assembly 2, which solvent and gas stream is operative to purge the interior of the assembly 2 of chemical residue. The reservoir is rinsed and purged with one or more chemical rinse solvents and an inert gas purging stream which are directed into the reservoir. One of the solvents can be a quick evaporating solvent which promotes drying of the reservoir and other surfaces in the dispensing that are contacted by the chemical. The purging solvent and gas stream is bled from the assembly 2 through the line 20. Thus, when the emptied assembly 2 is being purged of chemical residue, the valves 18 (if included), 22, and 30 will initially be closed, and the valve 32 will be opened to allow the admittance of the rinsing/purging solvent or solvent vapor and inert gas stream. The piston 10 (if included) may be reciprocated upwardly and downwardly in the reservoir slightly, during the rinsing/purging operation. After a suitable time period, the valve 22 is opened and the rinsing/purging solvent/gas/chemical vapor is bled from the assembly 2 through the line 20. Once again, during this step, the piston 10 may be reciprocated in the reservoir 4. After the rinsing/solvent/purging gas mixture has been flushed from the assembly, the valves 22 and 32 are closed, and the valve 30 is opened. Thereafter, a metered supply of fresh chemical is pumped into the reservoir 4 through the line 26 to reset the piston 10 (if included) to a predetermined elevated position in the reservoir 4. In cases when the piston 10 is not a part of the assembly 2, the valve 18 will be opened during the refilling operation. Once the reservoir 4 has been refilled, the valve 18 will be closed. Fresh filters 24 will be inserted into the line 20 when necessary. Once the reservoir 4 has been refilled with fresh chemical, the valve 30 is reclosed, and the assembly 2 is disconnected from the refurbishment/refilling station. The renewed assembly 2 can then be returned to the production line for reuse therein.

It will be readily appreciated that the chemical dispensing assembly of this invention eliminates the problem of disposing of environmentally contaminating chemical containers and allows the chemical receptacle to be reused over and over without having to be discarded. The rinsing and refilling operations can be accomplished in minimal time and with minimal effort. The various valves in the assembly can be manually operated, or can be solenoid valves that can be automatically operated by a system microprocessor controller.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. A method for refurbishing a pre-used and emptied ultra high purity chemical dispensing unit having a chemical reservoir with an integral dispensing passage, an integral rinsing passage, and an integral refilling passage, said method comprising the steps of:

a) closing said refilling passage;

b) opening said rinsing passage;

c) opening said dispensing passage;

d) admitting a stream of a rinsing material into said reservoir through said rinsing passage and purging said reservoir of chemical residue with said rinsing material;

e) withdrawing said rinsing material and purged chemical residue from said reservoir through said dispensing passage;

f) closing said rinsing passage;

g) closing said dispensing passage;

h) opening said refilling passage;

i) admitting a supply of fresh chemical into said reservoir through said refilling passage so as to refill said reservoir with said fresh chemical; and j) closing said refilling passage.

2. A reusable dispensing assembly for supplying an ultra high purity liquid chemical to a production line, said assembly comprising:

a) a reservoir for containing a supply of the chemical;

b) means for applying dispensing pressure to the chemical in said reservoir;

c) an outlet passage leading from said reservoir, said outlet passage providing an outlet for chemical dispensed from said reservoir;

d) a chemical refill passage communicating with said reservoir;

e) a reservoir rinse passage communicating with said reservoir, said rinse passage being separate from said refill passage;

f) a first valve in said refill passage;

g) second valve in said rinse passage, said first valve being operable to close said refill passage against flow of chemical into said reservoir when said second valve is opened to admit a chemical-rinsing medium into said reservoir via said rinse passage; and h) a third valve in said outlet passage, said third valve being operable to close when said first valve is opened to refill said reservoir with fresh chemical, and said third valve further being operable to open when said second valve is opened to admit said rinsing medium into said reservoir, whereby said outlet passage provides a conduit for flushing the rinsing medium from said reservoir.

3. The dispensing assembly of claim 2 wherein said reservoir and said passages are all contained in a unitary housing which includes means for disconnection from the production line and reconnection to a rinsing and refilling station and vice versa.

* * * * *